United States Patent
Chen et al.

(10) Patent No.: US 9,209,692 B2
(45) Date of Patent: Dec. 8, 2015

(54) HYSTERETIC CONTROL CONVERSION CIRCUIT AND POWER SUPPLY SYSTEM

(71) Applicant: Huawei Technologies Co., Ltd., Shenzhen (CN)

(72) Inventors: Liang Chen, Shenzhen (CN); Qiang Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 14/053,817

(22) Filed: Oct. 15, 2013

(65) Prior Publication Data

US 2014/0035544 A1 Feb. 6, 2014

Related U.S. Application Data

(63) Continuation of application No. PCT/CN2011/072721, filed on Apr. 13, 2011.

(51) Int. Cl.
*G05F 1/40* (2006.01)
*H02M 3/158* (2006.01)

(52) U.S. Cl.
CPC .................................. *H02M 3/158* (2013.01)

(58) Field of Classification Search
CPC ... H02M 3/156; H02M 3/158; H02M 3/1582; H02M 3/335; H02M 7/48
USPC ................. 323/222, 224, 266, 271, 282–290; 363/21.15, 49, 97, 98, 132
See application file for complete search history.

(56) References Cited

U.S. PATENT DOCUMENTS

| 5,825,163 A | 10/1998 | Pontarollo |
| 5,969,512 A | 10/1999 | Matsuyama |

(Continued)

FOREIGN PATENT DOCUMENTS

| CN | 1691479 A | 11/2005 |
| CN | 1286519 C | 11/2006 |

(Continued)

OTHER PUBLICATIONS

Foreign Communication From a Counterpart Application, PCT Application No. PCT/CN2011/072721, English Translation of International Search Report dated Jan. 19, 2012, 4 pages.

(Continued)

*Primary Examiner* — Rajnikant Patel
(74) *Attorney, Agent, or Firm* — Conley Rose, P.C.; Grant Rodolph; Adam J. Stegge

(57) ABSTRACT

The invention discloses a hysteretic control conversion circuit. The circuit includes a PMOS transistor and an NMOS transistor that are connected in series between a voltage input terminal and a ground terminal, a first voltage divider resistor string connected in series between a voltage output terminal and the ground terminal, a comparator, and a logic controller, where an output terminal of the comparator is connected to an input terminal of the logic controller, and two output terminals of the logic controller are respectively connected to grid electrodes of the PMOS transistor and the NMOS transistor. The hysteretic control conversion circuit also includes: a negative feedback module connected between the voltage output terminal and the input terminal of the comparator, and configured to perform negative feedback control over an output voltage of the hysteretic control conversion circuit and clamp the output voltage to a preset reference voltage.

10 Claims, 5 Drawing Sheets

(56) References Cited

U.S. PATENT DOCUMENTS

| | | | |
|---|---|---|---|
| 6,204,652 B1 | 3/2001 | Albou et al. | |
| 6,437,549 B1* | 8/2002 | Takagishi | H02J 7/0052 323/282 |
| 7,132,820 B2* | 11/2006 | Walters | H02M 3/156 323/282 |
| 7,482,791 B2* | 1/2009 | Stoichita | H02M 3/156 323/271 |
| 7,576,527 B1* | 8/2009 | Zhang | H02M 3/1563 323/282 |
| 7,990,120 B2* | 8/2011 | Leonard | H02M 3/156 323/224 |
| 8,106,639 B1* | 1/2012 | Ju et al. | 323/282 |
| 8,427,123 B2* | 4/2013 | Dearborn | 323/282 |
| 2001/0002102 A1 | 5/2001 | Petricek et al. | |
| 2005/0116695 A1 | 6/2005 | Morioka | |
| 2005/0242787 A1 | 11/2005 | Shirokoshi et al. | |
| 2009/0295445 A1 | 12/2009 | Ouyang et al. | |
| 2011/0018513 A1 | 1/2011 | Noda | |
| 2012/0326688 A1 | 12/2012 | Sun et al. | |

FOREIGN PATENT DOCUMENTS

| | | |
|---|---|---|
| CN | 101599694 A | 12/2009 |
| CN | 101924469 A | 12/2010 |
| CN | 101981793 A | 2/2011 |
| EP | 1039785 A1 | 9/2000 |
| JP | 2005168106 A | 6/2005 |
| JP | 2010057231 A | 3/2010 |

OTHER PUBLICATIONS

Foreign Communication From a Counterpart Application, PCT Application No. PCT/CN2011/072721, English Translation of Written Opinion dated Jan. 19, 2012, 3 pages.

Foreign Communication From a Counterpart Application, Chinese Application No. 201180000440.1, Chinese Office Action dated Sep. 27, 2012, 18 pages.

* cited by examiner

US 9,209,692 B2

HYSTERETIC CONTROL CONVERSION CIRCUIT AND POWER SUPPLY SYSTEM

CROSS-REFERENCE TO RELATED APPLICATIONS

This application is a continuation of International Application No. PCT/CN2011/072721, filed on Apr. 13, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to electronic technologies, and in particular, to a hysteretic control conversion circuit and a power supply system.

BACKGROUND

A direct current to direct current (DC-DC) converter is a voltage converter that effectively outputs a fixed voltage after converting an input voltage, and is widely applied in products such as a mobile phone, a Moving Picture Experts Group Audio Layer III player (e.g., an MP3 player), a digital camera, and a portable media player. DC-DC converters are generally classified into a buck converter (BUCK), a boost converter (BOOST), and a buck-boost converter (BUCK-BOOST), where the BUCK is a device for converting an input DC voltage to a lower output DC voltage, and hysteretic control is a control mode of the BUCK.

FIG. 1 is a schematic structural diagram of a BUCK circuit with hysteretic control in the prior art. As shown in FIG. 1, which illustrates a BUCK circuit with hysteretic control in the prior art, a P-channel metal oxide semiconductor (PMOS) transistor 1 and an N-channel metal oxide semiconductor (NMOS) transistor 2 respectively represent a switch to a power source and a switch to the ground. When the parasitic series resistor of an inductor is not taken into consideration, the output voltage Vo and the voltage at the LX terminal are approximately equal, so that the voltage $V_F$ is a component of the output voltage Vo, that is, $$V_F = V_O * \frac{R_2}{R_1 + R_2};$$

when $V_F$ is lower than a reference voltage $V_{REF}$ of a comparator 4, the PMOS transistor 1 is turned on and the NMOS transistor 2 is turned off, and the LX terminal of the inductor L is connected to an input voltage Vin, so that the current flowing through the inductor increases, thus increasing the output voltage, and further increasing $V_F$; when $V_F$ is increased to above $V_{REF}$, the PMOS transistor 1 is turned off, and the NMOS transistor 2 is turned on, so that the current decreases, thus decreasing the output voltage, and further decreasing $V_F$; and when $V_F$ is decreased to below $V_{REF}$, the circuit repeats the foregoing process.

During the process of implementing the present invention, the inventor discovers that the prior art has at least the following technical problems: The output voltage Vo is equal to the desired output voltage $$V_{REF} * \frac{R_1 + R_2}{R_2}$$

only when $V_F$ is equal to $V_{REF}$, and the output voltage and the desired output voltage are unequal when $V_F$ is bigger or smaller than $V_{REF}$; and in an actual circuit, the voltage value of $V_F$ is not equal to $V_{REF}$ because of the circuit structure and the effect of the parasitic series resistor of the inductor, so that there is an error between the output voltage and the desired output voltage.

SUMMARY

Embodiments of the present invention provide a hysteretic control conversion circuit and a power supply system, which solve the problem in an actual circuit that instability of an output voltage value causes an error between an output voltage and a desired output voltage, eliminate an output voltage error of a hysteretic BUCK, and improve precision of an output voltage of the hysteretic BUCK.

In order to achieve the foregoing objectives, an embodiment of the present invention provides a hysteretic control conversion circuit. The circuit includes a PMOS transistor and an NMOS transistor that are connected in series between a voltage input terminal and a ground terminal, a first voltage divider resistor string connected in series between a voltage output terminal and the ground terminal, a comparator, and a logic controller, where an output terminal of the comparator is connected to an input terminal of the logic controller, and two output terminals of the logic controller are respectively connected to grid electrodes of the PMOS transistor and the NMOS transistor. The hysteretic control conversion circuit also includes a negative feedback module connected between the voltage output terminal and the input terminal of the comparator, and configured to perform negative feedback control over an output voltage of the hysteretic control conversion circuit and clamp the output voltage to a preset reference voltage.

An embodiment of the present invention provides a power supply system, including: an input power source, a load circuit, and the hysteretic control conversion circuit.

In the hysteretic control conversion circuit and the power supply system according to the embodiments of the present invention, the negative feedback module is disposed between the voltage output terminal of the hysteretic control conversion circuit and the input terminal of the comparator to perform negative feedback control over the output voltage of the hysteretic control conversion circuit and clamp the output voltage to the preset reference voltage; the embodiments solve the problem in an actual circuit that instability of an output voltage value causes an error between an output voltage and a desired output voltage, eliminate an output voltage error of a hysteretic BUCK, and improve precision of an output voltage of the hysteretic BUCK.

BRIEF DESCRIPTION OF THE DRAWINGS

To make the technical solutions of the embodiments of the present invention or in the prior art clearer, accompanying drawings used in the description of the embodiments or the prior art are briefly introduced below. Evidently, the accompanying drawings in the following description illustrate some embodiments of the present invention, and persons of ordinary skill in the art may further obtain other drawings according to these accompanying drawings without creative efforts.

DETAILED DESCRIPTION

To make the objectives, technical solutions, and advantages of the embodiments of the present invention clearer, the technical solutions in the embodiments of the present invention are described clearly and completely below with reference to the accompanying drawings in the embodiments of the present invention. Evidently, the described embodiments are only part of rather than all of the embodiments of the present invention. All other embodiments that persons of ordinary skill in the art obtain without creative efforts based on the embodiments of the present invention shall fall within the scope of the present invention.

Figure 1:
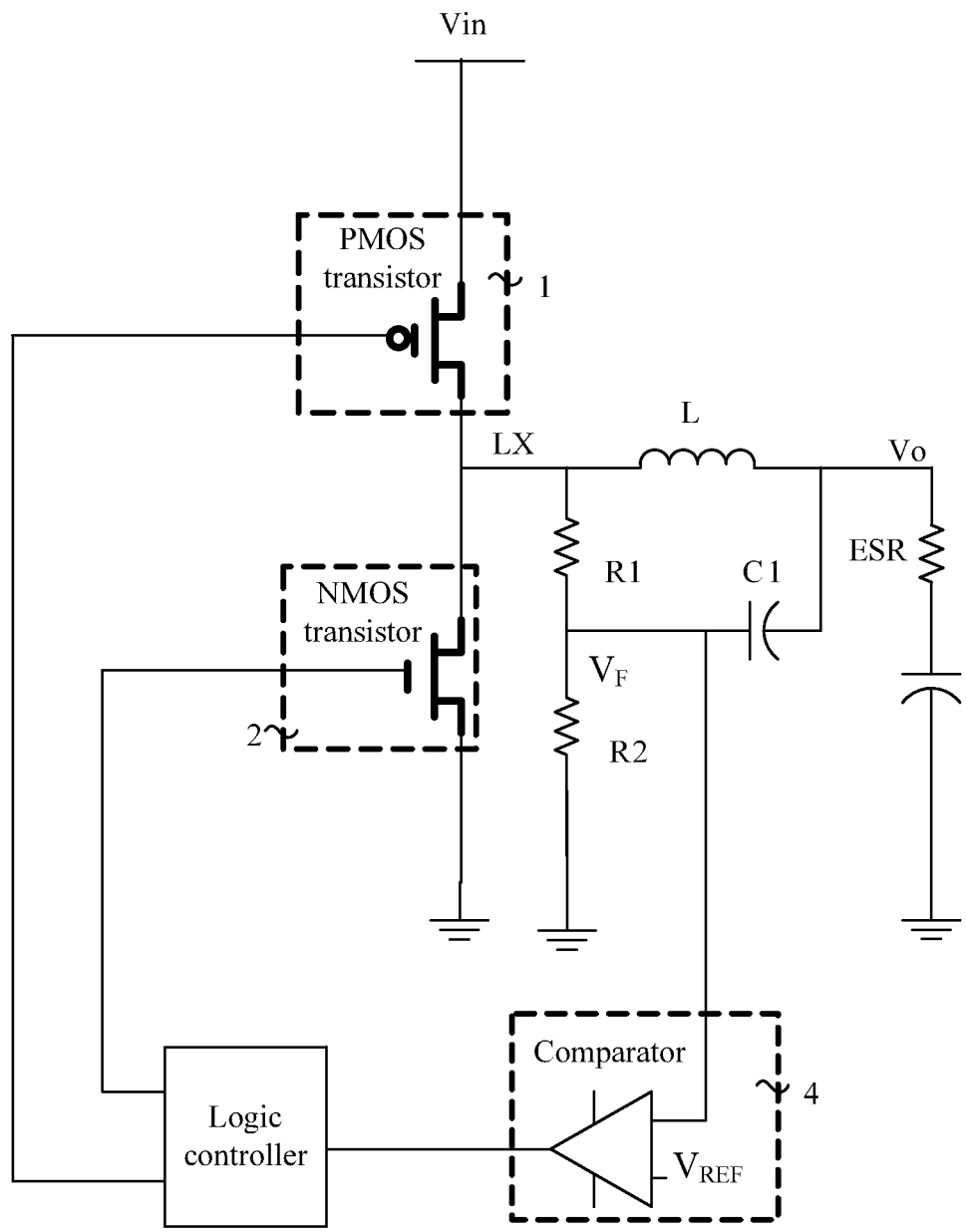
FIG. 1 is a schematic structural diagram of a BUCK circuit with hysteretic control in the prior art.
Figure 2:
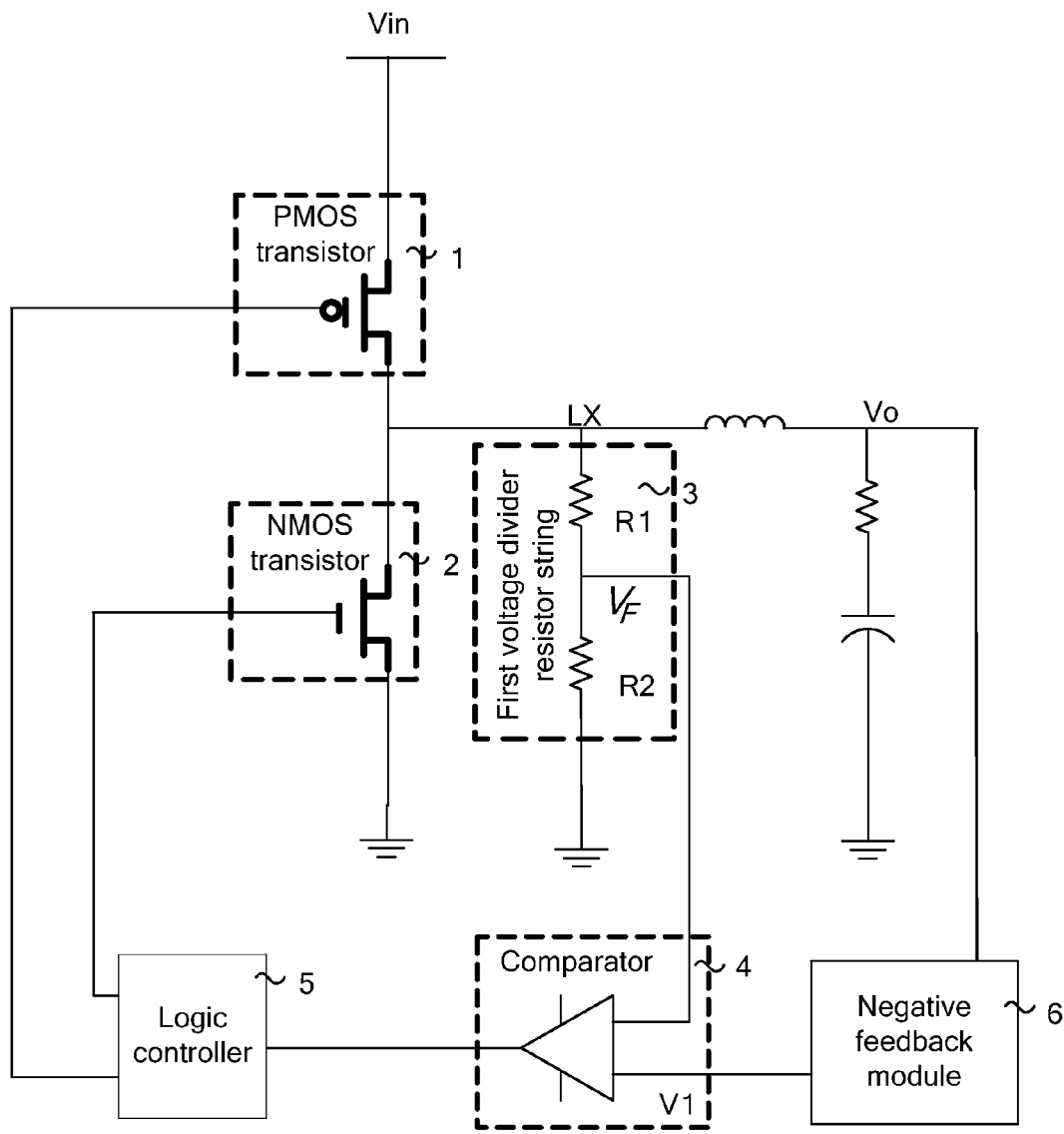
FIG. 2 is a schematic structural diagram of a first embodiment of a hysteretic control conversion circuit according to the present invention.

FIG. 2 is a schematic structural diagram of a first embodiment of a hysteretic control conversion circuit according to the present invention. As shown in FIG. 2, this embodiment provides a hysteretic control conversion circuit, which may specifically include a PMOS transistor 1, an NMOS transistor 2, a first voltage divider resistor string 3, a comparator 4, and a logic controller 5. The PMOS transistor 1 and the NMOS transistor 2 are connected in series between a voltage input terminal Vin of the hysteretic control circuit and a ground terminal, and the drain electrode of the PMOS transistor 1 and the source electrode of the NMOS transistor 2 may be connected; the first voltage divider resistor string 3 may include a first voltage divider resistor R1 and a second voltage divider resistor R2 that are connected in series, and the first voltage divider resistor string 3 is connected in series between a voltage output terminal Vo of the hysteretic control circuit and the ground terminal; the comparator 4 includes two input terminals and one output terminal, and the output terminal of the comparator 4 is connected to an input terminal of the logic controller 5; and two output terminals of the logic controller 5 are respectively connected to the grid electrodes of the PMOS transistor 1 and the NMOS transistor 2.

The hysteretic control conversion circuit in this embodiment may also include a negative feedback module 6, where the negative feedback module 6 is connected between the voltage output terminal Vo and the input terminal of the comparator 4. The negative feedback module 6 is configured to perform negative feedback control over the output voltage of the hysteretic control conversion circuit and clamp the output voltage to a reference voltage. The negative feedback module 6 in this embodiment obtains the output voltage and performs negative feedback control over the output voltage to generate a negative feedback signal of the output voltage, and reduce, according to the negative feedback signal, a comparison value V1 that is input to the comparator 4. It can be known that, when the output voltage increases, by means of negative feedback processing, the comparison value of the comparator is reduced, and further, under the control of the comparator and the logic controller, the PMOS transistor is turned off and the NMOS transistor is turned on, and the path between the voltage input terminal Vin and the voltage output terminal is disconnected, so that the current flowing to the voltage output terminal decreases, and thus, the output voltage is reduced; conversely, when the output voltage is reduced, by means of negative feedback processing, the comparison value of the comparator increases, and further, under the control of the comparator and the logic controller, the PMOS transistor is turned on and the NMOS transistor is turned off, and the voltage input terminal Vin is connected to the voltage output terminal through the PMOS transistor, so that the current flowing to the voltage output terminal increases, and thus, the output voltage increases; therefore, the output voltage is clamped to a stable preset reference voltage, where the voltage value of the preset reference voltage is a multiple of a reference voltage value, and may specifically be Vref*(R1+R2)/R2 here.

This embodiment provides a hysteretic control conversion circuit, where the negative feedback module is disposed between the voltage output terminal of the hysteretic control conversion circuit and the input terminal of the comparator to perform negative feedback control over the output voltage of the hysteretic control conversion circuit and clamp the output voltage to the preset reference voltage; this embodiment solves the problem in an actual circuit that instability of an output voltage value causes an error between an output voltage and a desired output voltage, eliminates an output voltage error of a hysteretic BUCK, and improves precision of an output voltage of the hysteretic BUCK.

Figure 3:
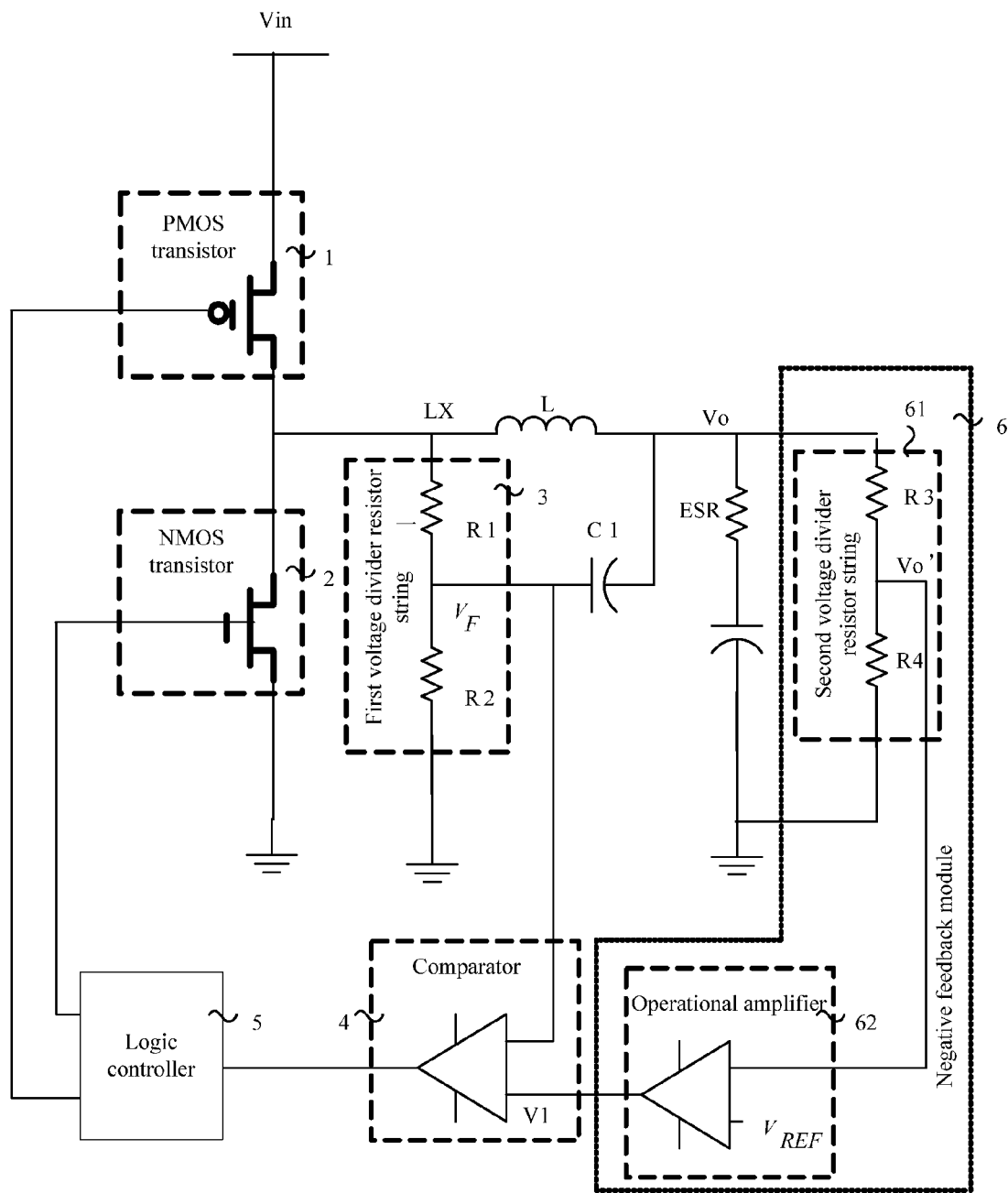
FIG. 3 is a schematic structural diagram of a second embodiment of a hysteretic control conversion circuit according to the present invention.

FIG. 3 is a schematic structural diagram of a second embodiment of a hysteretic control conversion circuit according to the present invention. As shown in FIG. 3, this embodiment provides a specific hysteretic control conversion circuit, and the hysteretic control conversion circuit may specifically include a PMOS transistor 1 and an NMOS transistor 2 that are connected in series between a voltage input terminal Vin of the hysteretic control circuit and a ground terminal, a first voltage divider resistor string 3 including a first voltage divider resistor R1 and a second voltage divider resistor R2, a comparator 4, and a logic controller 5. The first voltage divider resistor string 3 is connected in series between a connection point LX of the NMOS transistor and the PMOS transistor and the ground terminal, and an inductor L is connected in series between the connection point LX and a voltage output terminal Vo; a capacitor C1 is also connected between a resistor connection point $V_F$ of the first voltage divider resistor string 3 and the voltage output terminal, where the resistor connection point $V_F$ refers to a connection point between the first voltage divider resistor R1 and the second voltage divider resistor R2. The comparator 4 in this embodiment includes two input terminals and one output terminal. One input terminal of the comparator 4 is connected to the resistor connection point $V_F$, and the output terminal of the comparator 4 is connected to an input terminal of the logic controller 5. Two output terminals of the logic controller 5 are respectively connected to the grid electrodes of the PMOS transistor 1 and the NMOS transistor 2.

A negative feedback module 6 in this embodiment may specifically include a second voltage divider resistor string 61 and an operational amplifier 62. The second voltage divider resistor string 61 includes a third voltage divider resistor R3 and a fourth voltage divider resistor R4 that are connected in series. The operational amplifier includes two input terminals and one output terminal. The positive input terminal of the operational amplifier is connected to a resistor connection point Vo' of the second voltage divider resistor string 61, the negative input terminal of the operational amplifier 62 inputs a reference voltage $V_{REF}$, and the output terminal of the operational amplifier 62 is connected to another input terminal of the comparator 4. The resistor connection point Vo' here is a connection point between the third voltage divider resistor R3 and the fourth voltage divider resistor R4. The ratio of the third voltage divider resistor R3 to the fourth voltage divider resistor R4 in this embodiment is equal to the ratio of the first voltage divider resistor R1 to the second voltage divider resistor R2, that is, R3/R4=R1/R2. The function of the operational amplifier 62 in this embodiment is to amplify an error between the output voltage and the reference voltage to provide a reference level for the comparator 4.

In this embodiment, when the output voltage Vo increases, because Vo' and Vo have a linear voltage divider relationship, Vo' also increases accordingly, and by means of negative feedback processing of the operational amplifier, the output voltage value V1 is reduced, and further, the voltage value $V_F$ which is at the $V_F$ point and obtained by the comparator is bigger than V1; under the control of the comparator and the logic controller, the PMOS transistor is turned off and the NMOS transistor is turned on, and the path between the voltage input terminal Vin and the voltage output terminal Vo is disconnected, so that the current flowing to the voltage output terminal decreases, and therefore, the output voltage is reduced, thus clamping the output voltage to the reference voltage $V_{REF}$. Conversely, when the output voltage Vo is reduced, by means of negative feedback processing, the output voltage value V1 increases, and further, under the control of the comparator and the logic controller, the PMOS transistor is turned on and the NMOS transistor is turned off, and the voltage input terminal Vin is connected to the voltage output terminal by the PMOS transistor, so that the current flowing to the voltage output terminal increases, and therefore, the output voltage increases, thus clamping the output voltage to the reference voltage $V_{REF}$. Therefore, according to this embodiment, the output voltage may be clamped to a stable preset reference voltage, and the voltage value of the preset reference voltage may be a multiple of the reference voltage $V_{REF}$, which is a desired output voltage value.

In addition, in this embodiment, because there is a parasitic series resistor on the inductor L between the LX terminal and the voltage output voltage in an actual circuit, the existence of the voltage drop on the parasitic resistor makes the voltage at the LX terminal and the output voltage Vo unequal, which also results in an error between the output voltage and a desired output voltage; in this embodiment, the voltage divider resistor string and the operational amplifier are disposed at the output terminal to perform clamping control over the output voltage, thus eliminating the error of the output voltage.

This embodiment provides a hysteretic control conversion circuit, where the negative feedback module is disposed between the voltage output terminal of the hysteretic control conversion circuit and the input terminal of the comparator to perform negative feedback control over the output voltage of the hysteretic control conversion circuit and clamp the output voltage to the preset reference voltage; this embodiment solves the problem in an actual circuit that instability of the output voltage value causes an error between the output voltage and the desired output voltage, eliminates an output voltage error of a hysteretic BUCK, and improves precision of an output voltage of the hysteretic BUCK, so that the hysteretic BUCK may achieve precision of a voltage or current-type BUCK, and that the load transient response of the hysteretic BUCK is also improved and enhanced to a certain degree.

Figure 4:
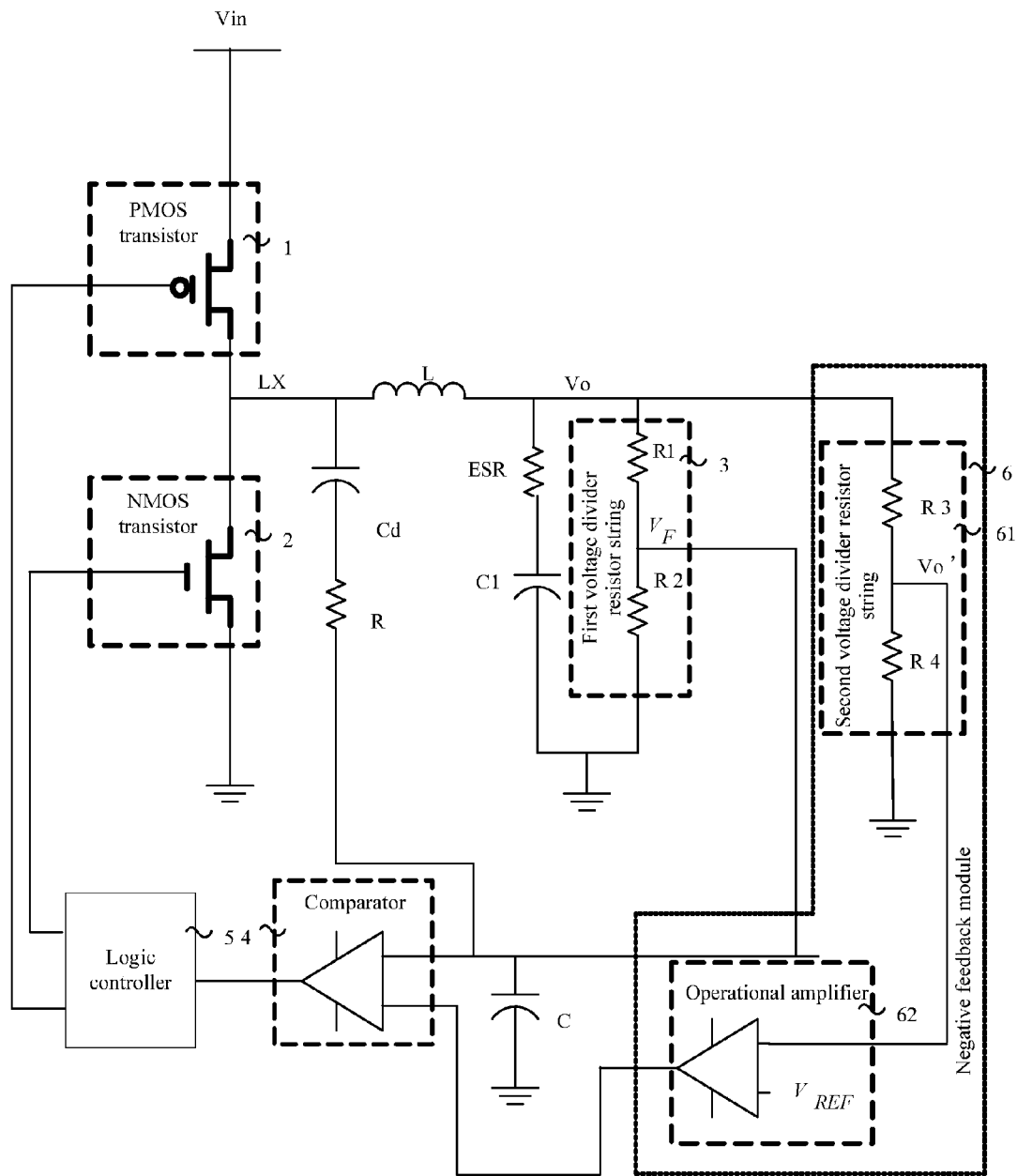
FIG. 4 is a schematic structural diagram of a third embodiment of a hysteretic control conversion circuit according to the present invention.

FIG. 4 is a schematic structural diagram of a third embodiment of a hysteretic control conversion circuit according to the present invention. As shown in FIG. 4, this embodiment provides a specific hysteretic control conversion circuit, and the hysteretic control conversion circuit may specifically include a PMOS transistor 1 and an NMOS transistor 2 that are connected in series between a voltage input terminal Vin of the hysteretic control circuit and a ground terminal, a first voltage divider resistor string 3 including a first voltage divider resistor R1 and a second voltage divider resistor R2, a comparator 4, and a logic controller 5. An inductor L is connected in series between a connection point LX of the NMOS transistor and the PMOS transistor and a voltage output terminal Vo, the first voltage divider resistor string 3 is connected in series between the voltage output terminal Vo and the ground terminal, and a capacitor C1 and a parasitic resistor ESR on the capacitor C1 are also connected between the voltage output terminal Vo and the ground terminal. The comparator 4 in this embodiment includes two input terminals and one output terminal. One input terminal of the comparator 4 is connected to a resistor connection point $V_F$ of the first voltage divider resistor string, and a capacitor Cd and a parasitic resistor R on the capacitor Cd are connected in series between this input terminal of the comparator 4 and the LX terminal; the output terminal of the comparator 4 is connected to the input terminal of the logic controller 5. Two output terminals of the logic controller 5 are respectively connected to the grid electrodes of the PMOS transistor 1 and the NMOS transistor 2.

A negative feedback module 6 in this embodiment may specifically include a second voltage divider resistor string 61 and an operational amplifier 62. The second voltage divider resistor string 61 includes a third voltage divider resistor R3 and a fourth voltage divider resistor R4 that are connected in series. The operational amplifier includes two input terminals and one output terminal. The positive input terminal of the operational amplifier is connected to a resistor connection point Vo' of the second voltage divider resistor string 61, the negative input terminal of the operational amplifier 62 inputs a reference voltage $V_{REF}$, and the output terminal of the operational amplifier 62 is connected to another input terminal of the comparator 4. The resistor connection point Vo' here is a connection point between the third voltage divider resistor R3 and the fourth voltage divider resistor R4. The ratio of the third voltage divider resistor R3 to the fourth voltage divider resistor R4 in this embodiment is equal to the ratio of the first voltage divider resistor R1 to the second voltage divider resistor R2, that is, R3/R4=R1/R2. The function of the operational amplifier 62 in this embodiment is to amplify an error between the output voltage and the reference voltage to provide a reference level for the comparator 4.

Similar to the foregoing embodiment, according to this embodiment, the output voltage may also be clamped to a stable voltage value that may be a reference voltage value, and the reference voltage value is a desired output voltage value. Furthermore, according to this embodiment, the voltage divider resistor string and the operational amplifier are disposed at the output terminal to perform clamping control over the output voltage, which may also eliminate the error of the output voltage.

This embodiment provides a hysteretic control conversion circuit, where the negative feedback module is disposed between the voltage output terminal of the hysteretic control conversion circuit and the input terminal of the comparator to perform negative feedback control over the output voltage of the hysteretic control conversion circuit and clamp the output voltage to the preset reference voltage; this embodiment solves the problem in an actual circuit that instability of an output voltage value causes an error between an output voltage and a desired output voltage, eliminates an output voltage error of a hysteretic BUCK, and improves precision of an output voltage of the hysteretic BUCK, so that the hysteretic BUCK may achieve precision of a voltage or current-type BUCK, and that the load transient response of the hysteretic BUCK is also improved and enhanced to a certain degree.

Figure 5:
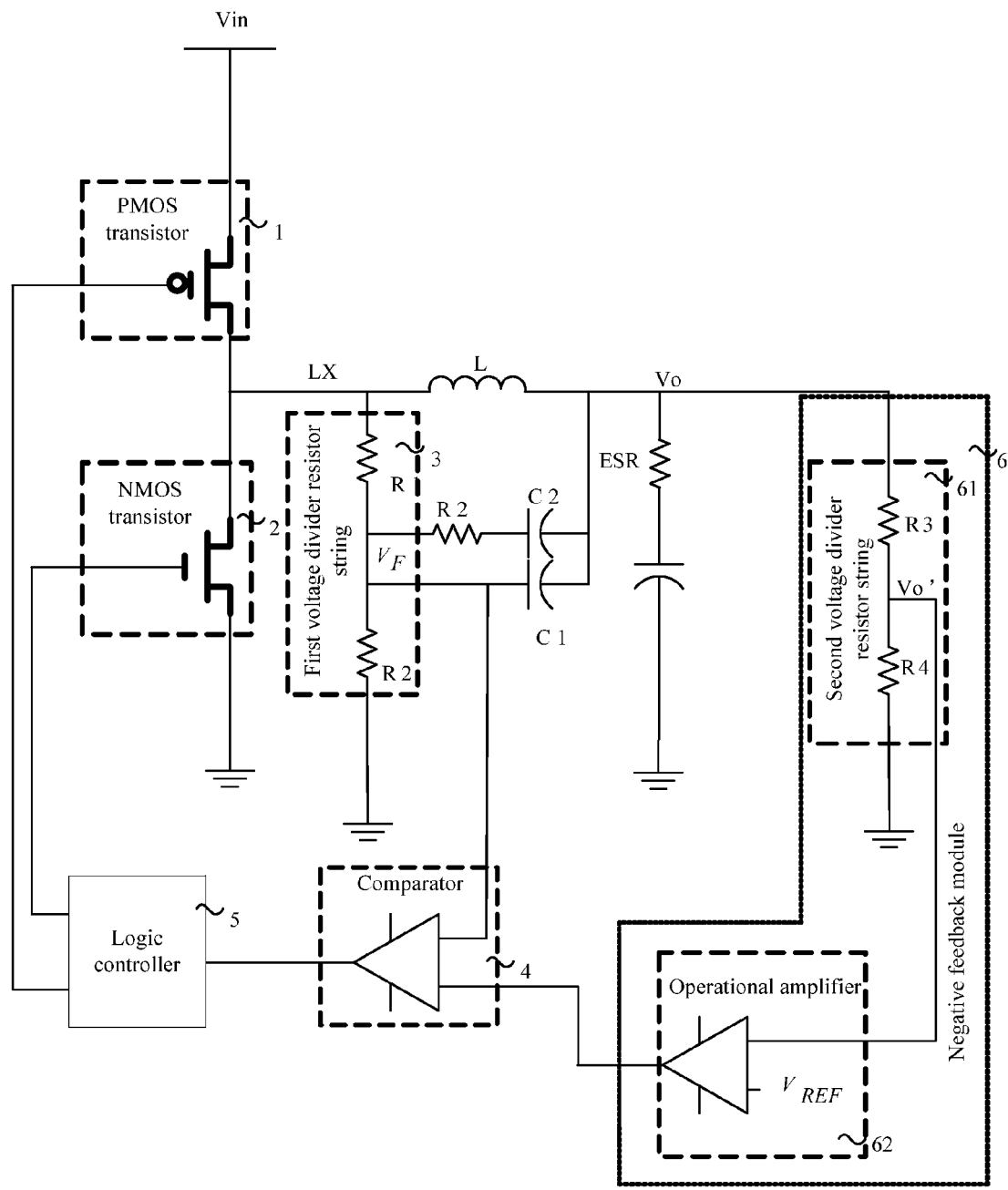
FIG. 5 is a schematic structural diagram of a fourth embodiment of a hysteretic control conversion circuit according to the present invention.

FIG. 5 is a schematic structural diagram of a fourth embodiment of a hysteretic control conversion circuit according to the present invention. As shown in FIG. 5, this embodiment provides a specific hysteretic control conversion circuit. The structure of the hysteretic control conversion circuit in this embodiment is similar to that in the second embodiment, and on the basis of the second embodiment, a capacitor C2 and a parasitic resistor R2 on the capacitor C2 are connected in series between the $V_F$ terminal and the voltage output terminal. A negative feedback module 6 in this embodiment may specifically include a second voltage divider resistor string 61 and an operational amplifier 62. The second voltage divider resistor string 61 includes a third voltage divider resistor R3 and a fourth voltage divider resistor R4 that are connected in series. The operational amplifier includes two input terminals and one output terminal. The positive input terminal of the operational amplifier is connected to a resistor connection point Vo' of the second voltage divider resistor string 61, the negative input terminal of the operational amplifier 62 inputs a reference voltage $V_{REF}$, and the output terminal of the operational amplifier 62 is connected to another input terminal of the comparator 4. The resistor connection point Vo' here is a connection point between the third voltage divider resistor R3 and the fourth voltage divider resistor R4. The ratio of the third voltage divider resistor R3 to the fourth voltage divider resistor R4 in this embodiment is equal to the ratio of the first voltage divider resistor R1 to the second voltage divider resistor R2, that is, R3/R4=R1/R2. The function of the operational amplifier 62 in this embodiment is to amplify an error between the output voltage and the reference voltage to provide a reference level for the comparator 4.

Similar to the foregoing embodiment, according to this embodiment, the output voltage may also be clamped to a stable voltage value that may be a reference voltage value, and the reference voltage value is a desired output voltage value. Furthermore, according to this embodiment, the voltage divider resistor string and the operational amplifier are disposed at the output terminal to perform clamping control over the output voltage, which may also eliminate the error of the output voltage.

This embodiment provides a hysteretic control conversion circuit, where the negative feedback module is disposed between the voltage output terminal of the hysteretic control conversion circuit and the input terminal of the comparator to perform negative feedback control over the output voltage of the hysteretic control conversion circuit and clamp the output voltage to the preset reference voltage; this embodiment solves the problem in an actual circuit that instability of an output voltage value causes an error between an output voltage and a desired output voltage, eliminates an output voltage error of a hysteretic BUCK, and improves precision of an output voltage of the hysteretic BUCK, so that the hysteretic BUCK may achieve precision of a voltage or current-type BUCK, and that the load transient response of the hysteretic BUCK is also improved and enhanced to a certain degree.

Further, persons skilled in the art may understand that, besides being applied to the DC-DC converters of various topologies in FIG. 3 to FIG. 5, the negative feedback module in this embodiment may also be applied to DC-DC converters of other topologies, such as a boost converter and a buck-boost converter, to improve precision of the output voltage of the circuit.

This embodiment also provides a power supply system, where the power supply system may include an input power source, a load circuit, and any one of the hysteretic control conversion circuits in FIG. 2 to FIG. 5.

Finally, it should be noted that the foregoing embodiments are only used to describe the technical solutions of the present invention instead of limiting the technical solutions of the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions described in the foregoing embodiments; however, these modification or replacements do not make the nature of the corresponding technical solutions depart from the spirit and scope of the technical solutions of the embodiments of the present invention.

What is claimed is:

1. A hysteretic control conversion circuit, comprising:
   a P-channel metal oxide semiconductor (PMOS) transistor;
   an N-channel metal oxide semiconductor (NMOS) transistor;
   a first voltage divider resistor;
   a comparator;
   a logic controller; and
   a negative feedback module,
   wherein the PMOS transistor and the NMOS transistor are connected in series between a voltage input terminal and a ground terminal,
   wherein the first voltage divider resistor is connected in series between a voltage output terminal and the ground terminal,
   wherein an output terminal of the comparator is connected to an input terminal of the logic controller,
   wherein two output terminals of the logic controller are respectively connected to grid electrodes of the PMOS transistor and the NMOS transistor, and
   wherein the negative feedback module is connected between the voltage output terminal and the input terminal of the comparator and is configured to perform negative feedback control over an output voltage of the hysteretic control conversion circuit and clamp the output voltage to a preset reference voltage.

2. The circuit according to claim 1, wherein the negative feedback module comprises:
   a second voltage divider resistor string; and
   an operational amplifier,
   wherein a resistor connection point of the second voltage divider resistor string is connected to a negative input terminal of the operational amplifier,
   wherein a reference voltage is input to a positive input terminal of the operational amplifier, and
   wherein an output terminal of the operational amplifier and a resistor connection point of the first voltage divider resistor string are respectively connected to two input terminals of the comparator.

3. The circuit according to claim 2, wherein the first voltage divider resistor string comprises a first voltage divider resistor and a second voltage divider resistor that are connected in series, wherein the second voltage divider resistor string comprises a third voltage divider resistor and a fourth voltage divider resistor that are connected in series, and wherein a ratio of the third voltage divider resistor to the fourth voltage divider resistor is equal to a ratio of the first voltage divider resistor to the second voltage divider resistor.

4. A power supply system, comprising:
an input power source;
a load circuit; and
a conversion circuit with hysteretic control that couples the input power source to the load circuit,
wherein the conversion circuit with hysteretic control comprises:
   a P-channel metal oxide semiconductor (PMOS) transistor;
   an N-channel metal oxide semiconductor (NMOS) transistor;
   a first voltage divider resistor;
   a comparator;
   a logic controller; and
   a negative feedback module,
   wherein the PMOS transistor and the NMOS transistor are connected in series between a voltage input terminal of the input power source and a ground terminal,
   wherein the first voltage divider resistor is connected in series between a voltage output terminal of the load circuit and the ground terminal,
   wherein an output terminal of the comparator is connected to an input terminal of the logic controller,
   wherein two output terminals of the logic controller are respectively connected to grid electrodes of the PMOS transistor and the NMOS transistor, and
   wherein the negative feedback module is connected between the voltage output terminal and the input terminal of the comparator and is configured to perform negative feedback control over an output voltage of the hysteretic control conversion circuit and clamp the output voltage to a preset reference voltage.

5. The power supply system according to claim 4, wherein the negative feedback module comprises:
a second voltage divider resistor string; and
an operational amplifier,
wherein a resistor connection point of the second voltage divider resistor string is connected to a negative input terminal of the operational amplifier,
wherein a reference voltage is input to a positive input terminal of the operational amplifier, and
wherein an output terminal of the operational amplifier and a resistor connection point of the first voltage divider resistor string are respectively connected to two input terminals of the comparator.

6. The power supply system according to claim 5, wherein the first voltage divider resistor string comprises a first voltage divider resistor and a second voltage divider resistor that are connected in series, wherein the second voltage divider resistor string comprises a third voltage divider resistor and a fourth voltage divider resistor that are connected in series, and wherein a ratio of the third voltage divider resistor to the fourth voltage divider resistor is equal to a ratio of the first voltage divider resistor to the second voltage divider resistor.

7. A method for using a hysteretic control conversion circuit, comprising:
connecting a P-channel metal oxide semiconductor (PMOS) transistor and an N-channel metal oxide semiconductor (NMOS) transistor in series between a voltage input terminal and a ground terminal;
connecting a first voltage divider resistor in series between a voltage output terminal and the ground terminal;
connecting an output terminal of a comparator to an input terminal of a logic controller;
connecting two output terminals of the logic controller to grid electrodes of the PMOS transistor and the NMOS transistor; connecting a negative feedback module between the voltage output terminal and the input terminal of the comparator; and
perform negative feedback control over an output voltage of the hysteretic control conversion circuit and clamp the output voltage to a preset reference voltage.

8. The method according to claim 7, further comprising:
connecting a resistor connection point of a second voltage divider resistor string to a negative terminal of an operation amplifier;
inputting a reference voltage to a positive input terminal of the operation amplifier; and
connecting an output terminal of the operational amplifier and a resistor connection point of the first voltage divider resistor string to two input terminals of the comparator.

9. The method according to claim 8, further comprising:
connecting a first voltage divider resistor and a second voltage divider resistor of the first voltage divider resistor string in series; and
connecting a third voltage divider resistor and a fourth voltage divider resistor of the second voltage divider resistor string in series,
wherein a ratio of the third voltage divider resistor to the fourth voltage divider resistor is equal to a ratio of the first voltage divider resistor to the second voltage divider resistor.

10. The method according to claim 7, further comprising coupling an input power source to a load circuit using the hysteretic control conversion circuit.

* * * * *